(No Model.)
J. G. L. BOETTCHER.
COMBINED WATER GAGE AND FAUCET.
No. 323,778. Patented Aug. 4, 1885.
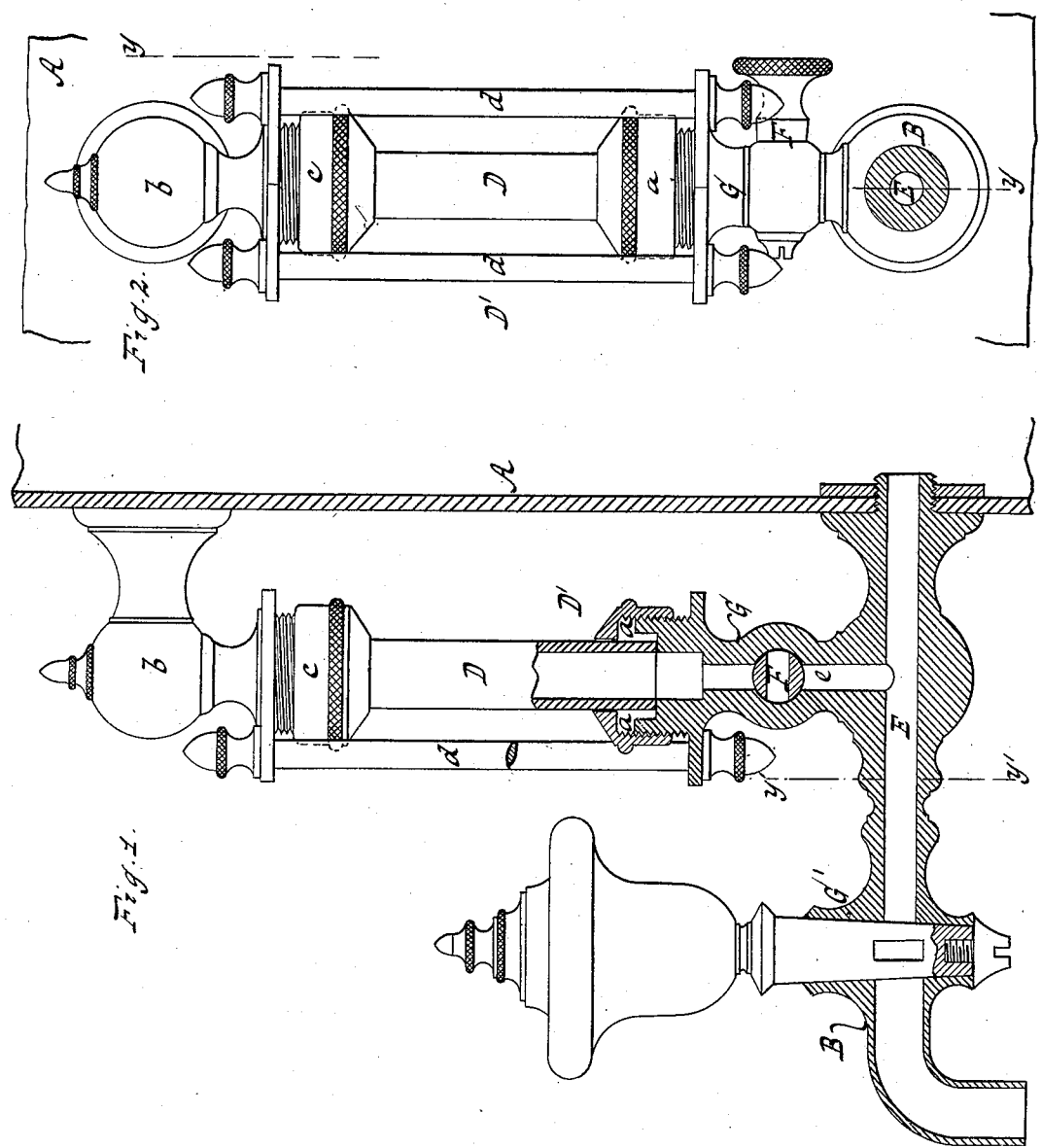
WITNESSES:
William Miller
Otto Hufeland
INVENTOR
John G. L. Boettcher
BY
Van Santvoord & Hauff
ATTORNEYS

UNITED STATES PATENT OFFICE.

JOHN G. L. BOETTCHER, OF BROOKLYN, NEW YORK.

COMBINED WATER GAGE AND FAUCET.

SPECIFICATION forming part of Letters Patent No. 323,778, dated August 4, 1885.

Application filed April 30, 1885. (No model.)

*To all whom it may concern:*

Be it known that I, JOHN G. L. BOETTCHER, a citizen of the United States, residing at Brooklyn, in the county of Kings and State of New York, have invented new and useful Improvements in a Combined Water Gage and Spout, of which the following is a specification.

My invention consists in a device for gaging the level of liquids in vessels, combined with means for drawing off the said liquid, the novel features of which are fully pointed out in the following specification and claim, and illustrated in the accompanying drawings, in which—

Figure 1 is a vertical section of my device in the plane $y\,y$, Fig. 2. Fig. 2 is a vertical section of the same in the plane $y'\,y'$.

Similar letters indicate corresponding parts.

In the drawings, the letter A designates a vessel of any suitable shape, to the lower part of which is attached a spout, B, having a lateral branch, G, to which is secured the lower end of the glass D of the gage D', and to render the joint tight a stuffing-box, $a$, of any ordinary construction, is employed. The upper end of the glass is connected to the upper part of the vessel by a pipe, $b$, and stuffing-box $c$, or in any other practical manner, and to protect the glass the ordinary guards $d$ are used. The lower part of the glass communicates with the vessel through the channel $e$ in the lateral branch, and a chamber, E, in the spout, and in order to control the liquid in the glass I place a stop-cock, F, in the lateral branch, so that when it is desired to draw part of the liquid from the vessel the gage can be temporarily shut off in order that its contents will not flow out with the liquid in the vessel.

In the forward end of the spout B is formed a faucet, G', of the ordinary type, by which the flow of liquid from the vessel is controlled.

My invention is especially adapted to be applied to vessels constructed to contain hot water or the like, such as are usually employed in restaurants for various purposes, as it takes the place of the ordinary draw-faucet, and constantly and accurately indicates the level of the liquid in the vessel, so that all danger of overheating such vessel, due to the evaporation of the water, is avoided.

It will be observed that the diameter of the curved portion of the spout is considerably larger than that of the chamber E, whereby the velocity of exit of the liquid is considerably diminished.

What I claim as new, and desire to secure by Letters Patent, is—

The combination, in a liquid-gage, of the spout B, having the longitudinal chamber E, of a diameter less than the internal diameter of the spout, and provided with a lateral branch, G, the glass D, connected with the latter, a stop-cock, F, between the glass and the chamber, and a valve, G, in the spout in advance of the chamber, substantially as described.

In testimony whereof I have hereunto set my hand and seal in the presence of two subscribing witnesses.

JOHN G. L. BOETTCHER. [L. S.]

Witnesses:
W. HAUFF,
E. F. KASTENHUBER.